Figure 2:
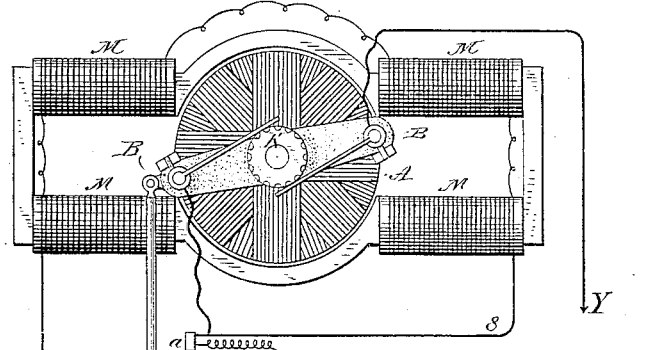

(No Model.) 2 Sheets—Sheet 1.
E. THOMSON.
ELECTRIC POWER DISTRIBUTION SYSTEM.
No. 294,095. Patented Feb. 26, 1884.
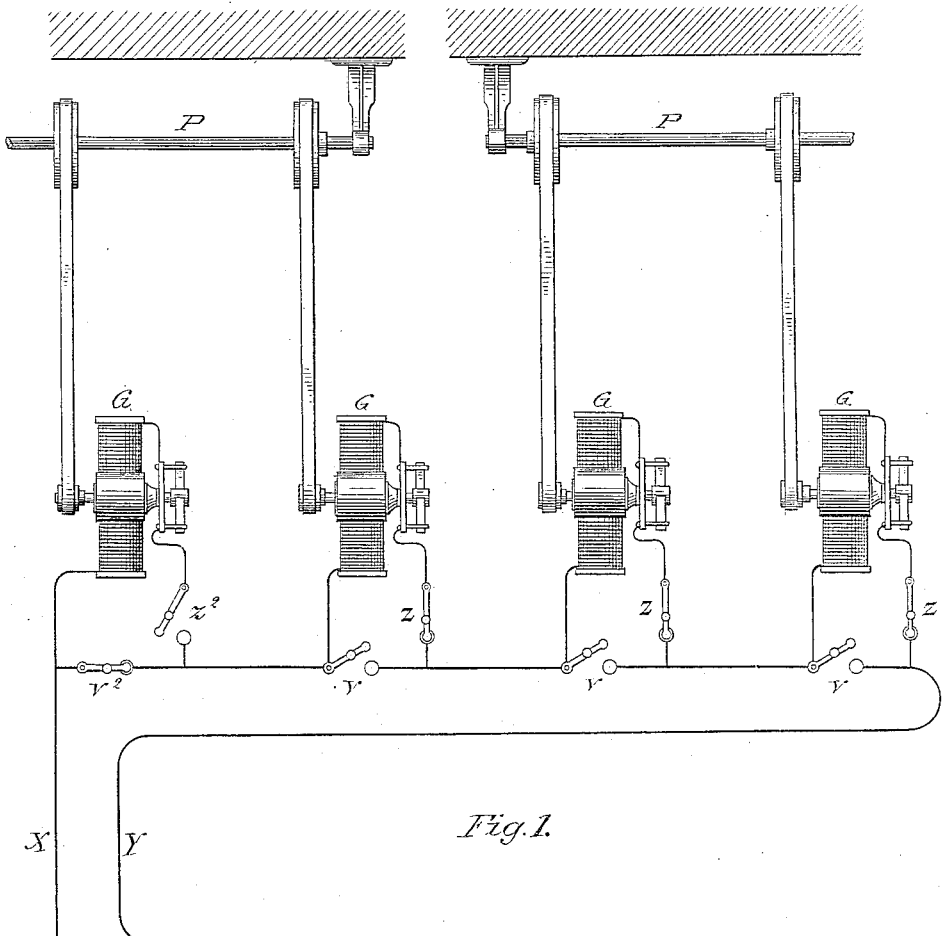
Fig. 1.
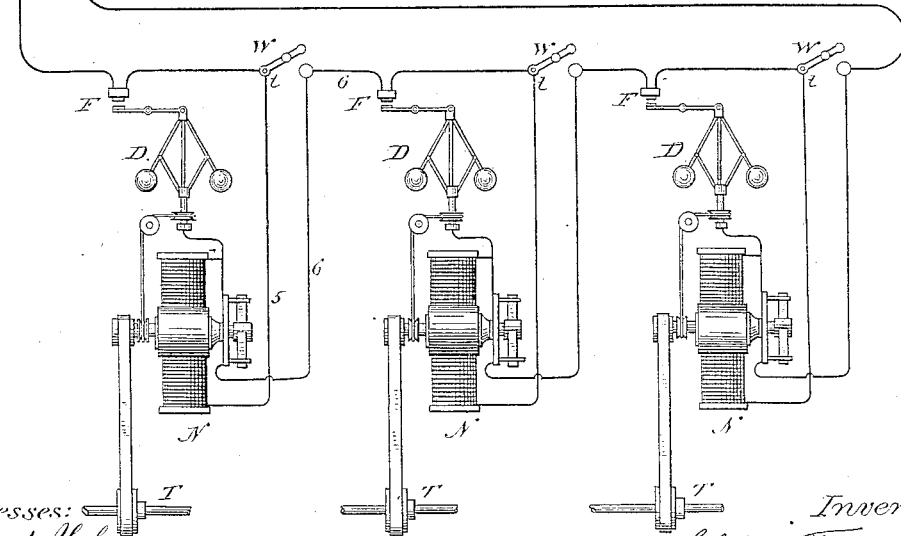
Witnesses:
Ernest Abshagen
Thos. Dorney
Inventor:
Elihu Thomson
By his Attorney:

(No Model.)

E. THOMSON.
ELECTRIC POWER DISTRIBUTION SYSTEM.

No. 294,095. Patented Feb. 26, 1884.

Witnesses:
Ernest Abshagen

Inventor:
Elihu Thomson
By his Attorney

UNITED STATES PATENT OFFICE.

ELIHU THOMSON, OF NEW BRITAIN, CONNECTICUT.

ELECTRIC-POWER-DISTRIBUTION SYSTEM.

SPECIFICATION forming part of Letters Patent No. 294,095, dated February 26, 1884.

Application filed May 25, 1883. (No model.)

*To all whom it may concern:*

Be it known that I, ELIHU THOMSON, a citizen of the United States, and a resident of New Britain, in the county of Hartford and State of Connecticut, have invented certain new and useful Improvements in Electric-Power-Distribution Systems, of which the following is a specification.

My invention relates to the transmission and distribution of motive power by means of electricity, and more particularly to a system or combination in which electric generators arranged and supplying currents in series are placed in circuit with a number of electric motors, also arranged in series with one another and with said generators, so that the current supplied in tension by all of the generators in action passes through all of the motors that are for the time being in use.

My invention consists, first, in a number of generators arranged in series, and each provided with suitable automatic devices for regulating its electro-motive force, so as to keep the current at all times constant, and a number of electric motors in series with one another and with said generators, and each provided with a governor operated by changes in the speed of the motor, and serving to automatically change the strength of the field in which the armature of said motor revolves.

My invention consists, further, in a series of electric generators arranged to supply current in tension, each of said generators being provided with an automatic shunting device for its field-magnet, and a series of motors, each provided with a suitable means for automatically shunting its field-magnet when the speed of the motor becomes abnormal.

My invention consists, further, in certain combinations entering into the system herein described, that will be specified in the claims.

In my system the generators and motors may be arranged in any desired relation—that is, all of the generators may be coupled together in series in one portion of the circuit, and all of the motors in series in another portion of the circuit; or generators and motors may be arranged to alternate with one another in any number and in any order. As the generators are placed in series, it suffices to have the regulating appliances of the whole number sufficient to collectively produce a constant current. My invention is not limited to any particular kind of generator, nor to any particular form of motor. It is only necessary that the generators should be provided with some means for automatically varying the electro-motive force in obedience to fluctuations of line-current—that is, when from any cause whatever the strength of the line-current tends to rise, the electro-motive force of the generator or generators combined should fall, in order to keep the current strength supplied constant. The automatic regulation may be produced in any of the well-known ways—as, for instance, by varying the speed of the armature, by increasing and diminishing the strength of the field in which the armature moves, by shifting the commutator-brushes, or in any other suitable manner. The motors are provided with any suitable means, acting with the changes in the speed of movement of the motor, so as upon an increase above normal speed to change or cut down the strength of current in the field-magnet of the motor. This may be accomplished by means of a switch that shall be operated by the changed speed of the motor and close a shunt around the field when the speed rises above normal. The desired operation of the switch may be secured by means of an ordinary centrifugal governor connected with the revolving motor and serving to operate the switch.

Figure 4:
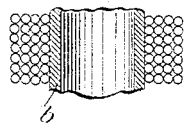
Figure 3:
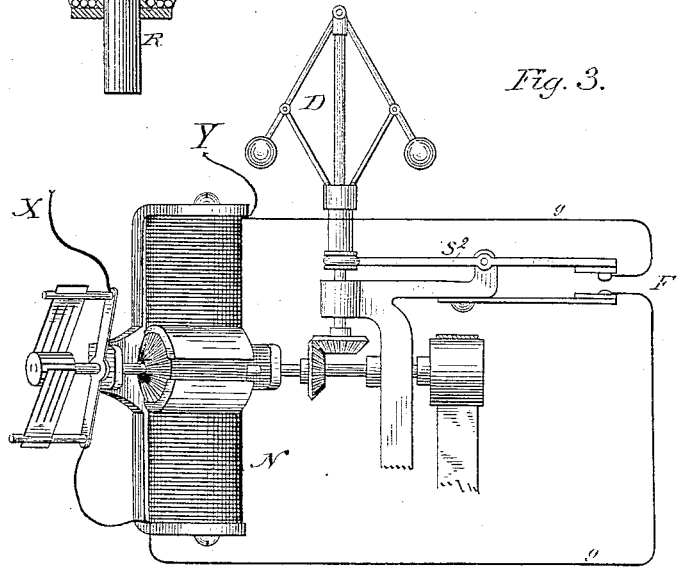

In the accompanying drawings, Figure 1 is a diagram showing a preferred arrangement of my power-distributing system. Fig. 2 shows in detail a preferred device for regulating the strength of current supplied by the generator. Fig. 3 shows a motor with its governing appliances in detail. Fig. 4 is a section of a portion of a field-magnet on the motor.

In Fig. 1, G G G G indicate a series of dynamo or magneto electric machines driven by any suitable power applied through shafts P, to which the machines are belted, or by any other suitable connection. These machines are connected so as to supply current for tension, and switches Z Z Z and V V V are provided, by means of which the connection of any one generator may be broken and a shunt completed around the disconnected generator.

In the drawings the three right-hand generators are shown as supplying currents to the main X Y, while the left-hand generator is disconnected by switch $Z^2$, and also short-circuited through the switch $V^2$. Each of these generators is provided with a regulator—such, for instance, as is shown in Fig. 2, and will be presently described. N N N indicate a series of motors, each provided with a shunting-switch, W W, and each belted to a shaft, I, by which they impart movement to any mechanism. These motors are of any suitable kind, and are connected in series with one another in the main X Y. The circuit of each motor is, as usual and as indicated, from switch-point $t$, through wire 5, to the field-magnet coils, thence through the armature of the motor, and by wire 6 to the next motor of the series. Driven by the shaft of each motor is a centrifugal governor, D, of any kind, controlling a switch-lever whose contacts are indicated at F, which latter serve, when closed, to complete a shunt around the whole or a part of the field-magnet coils of the generator, or in any equivalent manner, to control the field of said generator, so as to cut it down upon the lifting of the governor-balls of D upon an increased speed of the motor to an abnormal extent. The adjustments are such that the field is shunted or weakened when an abnormal speed is attained, the armature being still traversed by the line-current. Said line-current is at the same time kept constant in volume, or nearly so, by means of the regulators upon the generators, whether one or more motors are in circuit. Under the conditions described, by winding the generators and motors in accordance with the recognized principles of motive-power transmission, the speed of the motors will remain practically constant unless one or more of them are overloaded; but no harm to the generators or the work done by the other motors can happen from the stoppage or decrease of speed in any motor due to overloading, since the increase in the flow of current which would accompany the stoppage of any one motor will be compensated for by the regulators of the generators; neither can any one or more of the motors run away under diminished load under the conditions described, owing to the governors D.

In Fig. 2, which shows a form of regulator to be used with a generator, A indicates an armature of any desired construction, and K the commutator therefor. B indicates the usual movable yoke, carrying the commutator-brushes, which yoke is in the present instance shifted automatically by means of an electro-magnet, C, the movable core of which, R, is connected with said yoke. The coils of magnet C are connected in any suitable way, either in direct or derived circuit, with the main X Y, so that variations of current therein, attendant upon variations of the main current from the generator, will produce movement of the core in obvious way. P indicates a sliding contact-piece, also moving with the core, and riding upon a series of contact-plates, $a$, for an adjustable rheostat, S, of usual form, which latter is included in a shunt or derived circuit around the field-magnets M of the generator, said shunt-circuit being by wire 7, contact P, a contact-plate, $a$, and thence through one or more of the resistance-coils of the rheostat S and wire 8. Any other adjustable resistance device might be used in place of that described. The adjustments are such that the upward movement of the core R, due to an increase in the line-current, will diminish the resistance in the derived circuit around the field-magnets, and thereby weaken the strength of the field in which the armature moves. At the same time a movement will be imparted to the yoke B B and the commutator-brushes, so that the brushes will take current from the armature at less effective points.

I do not herein broadly claim the simultaneous adjustment of the commutator and field, as it will be made the subject of a separate application.

In Fig. 3 the motor is shown in detail. It is merely a dynamo-electric machine of any desirable pattern, and is provided with a centrifugal field shunting or neutralizing device.

D is a centrifugal governor, driven from the shaft of the motor by a bevel-gearing, as shown, and connected with a lever, $S^2$, which, when the governor-balls rise with an increase of speed to an abnormal extent, serves to close contacts at F, thus completing a circuit, 9, which forms, as indicated, a shunt-circuit around the field-magnets of the motor. The circuit through the motor is from one main wire, X, through the armature and the field-magnets, to Y. To avoid spark at the contacts F, it is preferable to wind under the field-wire of the motor-magnets a closed band of copper or any closed conducting-path. This permits the contacts at F to be opened without spark or burning. The band is shown at $b$, Fig. 4, as placed between the core and the magnet-coils.

I do not limit myself to the construction of the devices for imparting movement to the shunting-contacts F upon an increase of speed in the motor, as this part of the apparatus may obviously be varied in many ways.

What I claim as my invention is—

1. A system of motive-power transmission comprising in combination upon the same circuit two or more generators and two or more motors, all in series with one another, switch devices for open-circuiting each generator, and means for shunting each generator and each motor.

2. A system of motive-power transmission comprising in combination two or more driven electric generators and two or more motors or translators coupled in series, as described, an automatic regulator for each generator, and an automatic governor for each motor, that cuts down the strength of the motor field-magnet upon an increase of the motor's speed beyond a determinate point.

3. The combination upon one and the same electric circuit, and in series with one another, of two or more electric generators, each provided with a suitable current-governor, and two or more electric motors, each provided with means for closing a shunt around its field upon an abnormal increase of speed.

4. The combination upon one and the same circuit of two or more electric generators, two or more electric motors, means for varying the electro-motive force of the current generated in accordance with variations in the current strength upon the main circuit, and motor-governors for cutting down the effective magnetism of such motor when their speed increases to an abnormal extent.

5. The combination upon one and the same electric circuit of two or more electric generators, an automatic regulator for each generator that simultaneously shifts the commutator-brushes and decreases the field-magnetism upon an increase in the current upon the general circuit supplied by the generators, and two or more motors arranged in series with one another and with said generators, each provided with a suitable automatic speed-governor that shunts the field-magnet of the motor upon an abnormal increase in the speed.

6. The combination of the motor N, governor D, lever $S^2$, contacts F, and derived or shunt circuit 9.

Signed at Boston, in the county of Suffolk and State of Massachusetts, this 23d day of May, A. D. 1883.

ELIHU THOMSON.

Witnesses:
HARRY B. ROGERS,
E. C. WHITNEY.